United States Patent

Wiles et al.

[15] 3,644,911
[45] Feb. 22, 1972

[54] REMOTE POSITION INDICATOR

[72] Inventors: David John Wiles, Churchdown, Gloucester; John Milford Wright, Tewkesbury, both of England

[73] Assignee: Dowty Hydraulic Units Limited

[22] Filed: Apr. 8, 1969

[21] Appl. No.: 814,257

[52] U.S. Cl. ............................ 340/177 VA, 340/210, 330/1, 330/12
[51] Int. Cl. .......................................................... G08c 15/00
[58] Field of Search .................. 340/177, 266, 210; 330/69, 330/1 A; 323/4

[56] References Cited

UNITED STATES PATENTS

| | | | |
|---|---|---|---|
| 3,188,576 | 6/1965 | Lewis, Jr. | 330/69 |
| 3,222,600 | 12/1965 | Gewirtz | 330/69 |
| 3,375,434 | 3/1968 | Shapiro | 323/4 |
| 3,387,266 | 6/1968 | Swartwout et al. | 340/150 |
| 3,527,984 | 9/1970 | Flanagan | 317/9 AC |
| 3,028,756 | 4/1962 | Takagishi | 73/342 |
| 3,036,464 | 5/1962 | Beeston | 73/342 |
| 3,106,645 | 10/1963 | Kaufman | 307/310 |
| 3,281,684 | 10/1966 | Reeds | 324/98 |
| 3,413,853 | 12/1968 | Rowell | 73/342 |
| 3,503,261 | 3/1970 | Riester | 73/362 |

Primary Examiner—John W. Caldwell
Assistant Examiner—Robert J. Mooney
Attorney—Young & Thompson

[57] ABSTRACT

A remote position indicator for a movable member located in an inflammable atmosphere which comprises a variable resistor mechanically connected for adjustment by the movable member, an intrinsically safe power supply arranged to pass current through the variable resistor, an amplifier comprised entirely by one or more transistors and one or more resistors connected to receive the voltage signal delivered by the variable resistor, and a meter connected to receive the amplified signal delivered by the amplifier whereby to indicate the position of the movable member.

5 Claims, 3 Drawing Figures

DAVID JOHN WILES
JOHN MILFORD WRIGHT
INVENTORS

REMOTE POSITION INDICATOR

This invention relates to a remote position indicator for indication at a remote position the movement of a movable member located in an inflammable atmosphere. In accordance with the present invention a remote position indicator for a movable member located in an inflammable atmosphere comprises a variable resistor mechanically connected for adjustment by the movable member, an intrinsically safe power supply arranged to pass current through the variable resistor, an amplifier comprised entirely by one or more transistors and one or more resistors connected to receive the voltage signal delivered by the variable resistor, and a meter connected to receive the amplified signal delivered by the amplifier and to indicate accordingly.

The meter will indicate the magnitude of the signal delivered by the variable resistor and will thus indicate the position of the movable member.

The avoidance of inductance and capacitance in the amplifier helps to ensure intrinsic safety of the amplifier.

The variable resistor may be connected to the power supply through a constant current transistor circuit whereby a voltage signal can be obtained which is proportional to the resistance.

Preferably the amplification factor of the amplifier is variable to enable the meter indication to be adjusted to the desired relation to the movement of the movable member.

Resistance variation of the variable resistor following maximum movement of the movable member may be arranged to cause movement of the meter only over a selected part of its total available movement. In this way when the meter indication falls outside the selected part of its movement it can be assumed that a fault has developed within the indicator.

How the invention can be carried into effect will now be particularly described with reference to the accompanying drawings, in which, FIG. 1 is a circuit diagram of an amplifier module for use in the invention.

Figure 2:
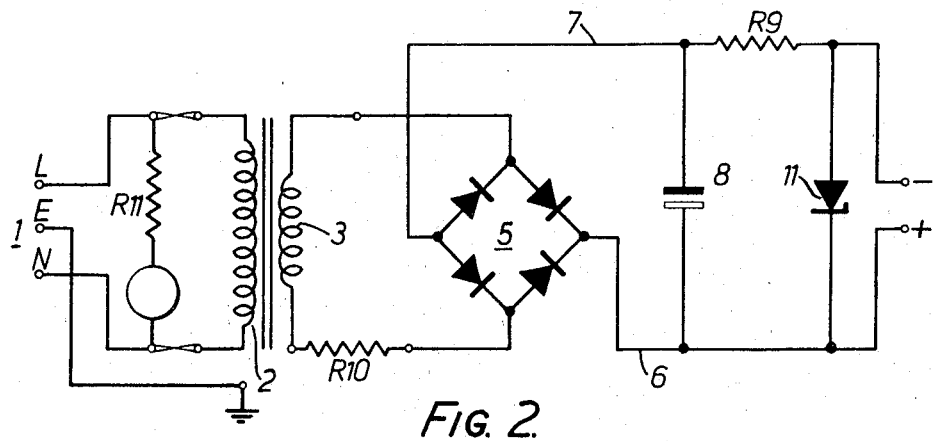
FIG. 2 is a circuit diagram of the power supply for use in the invention.

Reference is made initially to the power supply shown in FIG. 2. Power for operation of the invention is taken from the conventional alternating current supply mains 1 which connects to the primary winding, 2 of a conventional mains transformer. A secondary winding 3 of this transformer delivers a low alternating voltage. This secondary is connected through a resistor R10 to a bridge rectifier 5 which delivers direct current to the conductors 6 and 7 which are respectively positive and negative. A reservoir condenser 8 will smooth pulsations of the rectified current. A series resistor R9 in the conductor 7 carries current from the condenser 8. A Zener diode 11 is connected across the conductors 6 and 7 to stabilize the voltage delivered through the resistor R9. The resistors R9 and R10, the condenser 8 and the Zener diode 11 will assist in ensuring intrinsic safety of the power supply. The effect of intrinsic safety occurs where the conductors 6 and 7 extend into an inflammable atmosphere and is that a spark produced either by an accidental breaking of the conductors or by short circuiting together of the conductors cannot ignite the atmosphere. The reason for this is that the components R9, R10, 8 and 11 prevent such a spark from having sufficient energy to ignite the inflammable atmosphere.

Figure 1:
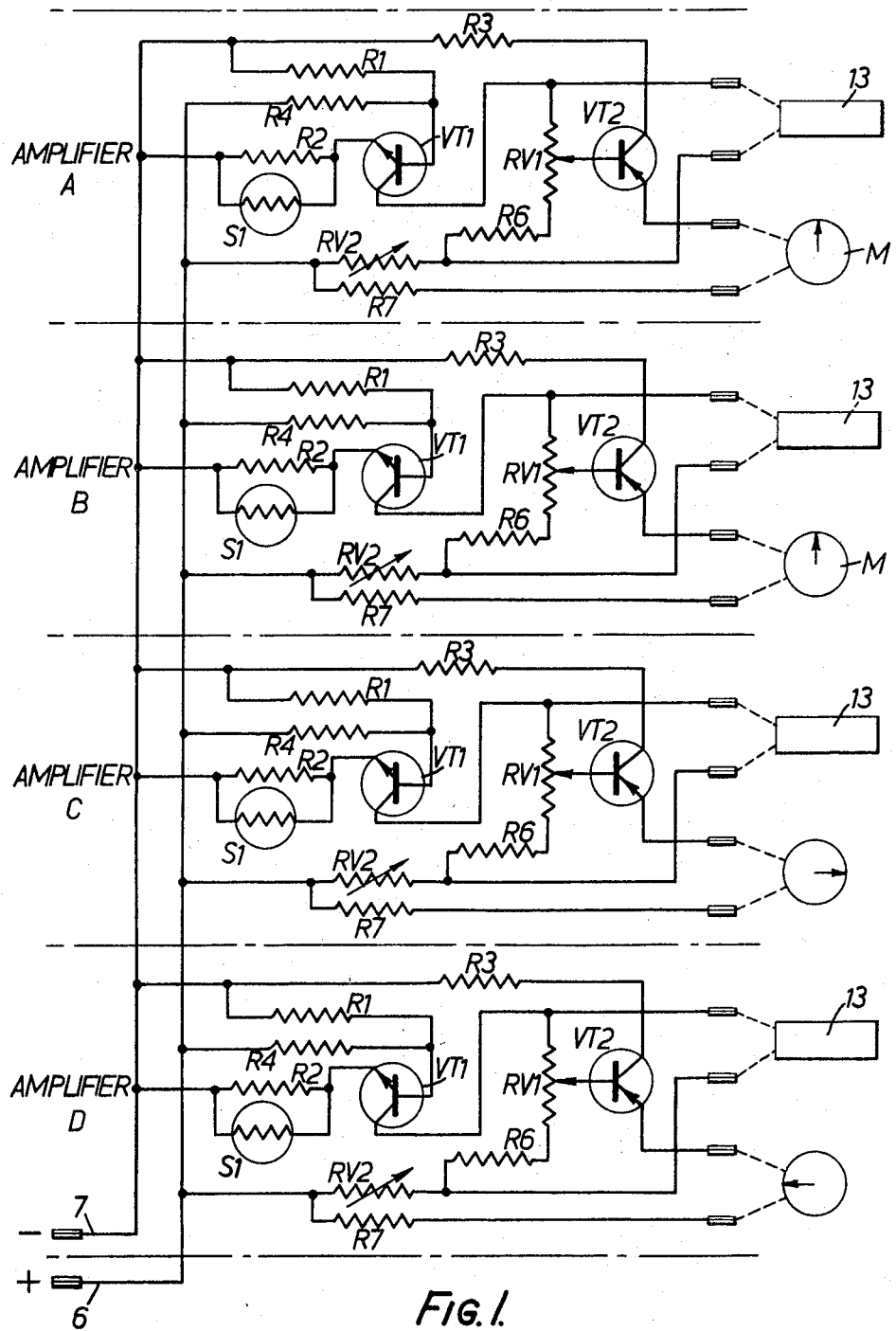

Reference is now made to FIG. 1 of the accompanying drawings in which is illustrated the circuit diagram of an amplifier module having four separate amplifiers a, b, c and d. The illustrated embodiment of the invention is to provide a remote indication of the positions of a plurality of valves in a petroleum installation. As will be explained later in this specification, a plurality of modules as illustrated in FIG. 1 may be employed to provide a large number of position indicators. A transducer 13 is associated with each valve, the transducer comprising a simple variable resistor whose resistance is adjusted by the movement of the valve. Any conventional variable resistor may be used, preference being given to the constructions having a low value of inductance. The amplifiers a, b, c, and d are all identical and only amplifier a will be described in detail. The resistor forming part of transducer 13 is connected into a constant current circuit. This circuit comprises an NPN-transistor VT1, a pair of resistors R1 and R4 connected across the conductors 6 and 7, the junction of these resistors being connected to the base of transistor VT1, a resistor R2 connected from conductor 7 to the emitter of transistor VT1, and a variable resistor RV2 connected in series with the transducer resistance 13 between the conductor 6 and the collector of transistor VT1. Parallel connected with the transducer resistance 13 is a potentiometer RV1 and a resistor R6. The resistors R1 and R4 determine a voltage to be applied to the base of the transistor VT1, such voltage varying with variations in the supply voltage to the conductors 6 and 7. The function of the constant current circuit is well known and in particular the current through it will be retained substantially constant irrespectively of the resistance of the transducer 13 so that the voltage appearing across the transducer 13 will be proportional to the actual resistance. To compensate for temperature variations of transistor VT1, the resistor R2 is parallel connected by a resistor S1 having a positive temperature coefficient i.e., its resistance increases substantially as temperature increases.

The amplifier comprises a PNP-transistor VT2, a resistor R3 connected from the collector of transistor VT2 to conductor 7 and a resistor R7 connected in series with milliameter M between the emitter of transistor VT2 and the conductor 6. This milliameter is preferably of the kind in which the indicating pointer is angularly movable over 300° or so and forms the remote indicator. The voltage signal selected by the potentiometer RV1 is fed to the base of the transistor VT2. The operation of transistor VT2 is quite conventional in that the voltage signal fed to its base controls the current flow through the emitter and collector and in particular it controls the current flow through the milliameter M.

In setting up the described indicator for use the potentiometer RV1 is preset to ensure that the full range of movement of the movable member driving the transducer 13 corresponds to a selected part of the scale of the milliameter M. When in use any indication outside this part of the scale will indicate a fault in the indicator or the power supply so that corresponding precautions or safety measures may then be taken. For example when the milliameter has a full scale movement of 300° it may be arranged that the selected part of the scale extends only over 180° so arranged that in the 300° movement that the first 60° and the last 60° of the 300° movement are zones within which indication can only take place if there is a fault in the indicator or the power supply.

In any of the illustrated amplifiers in FIG. 1 the resistor values may be as follows:

| | |
|---|---|
| R1 | 470 ohms |
| R2 | 1500 ohms |
| R3 | 1000 ohms |
| R4 | 2700 ohms |
| R6 | 3900 ohms |
| R7 | 1200 ohms |

Figure 3:
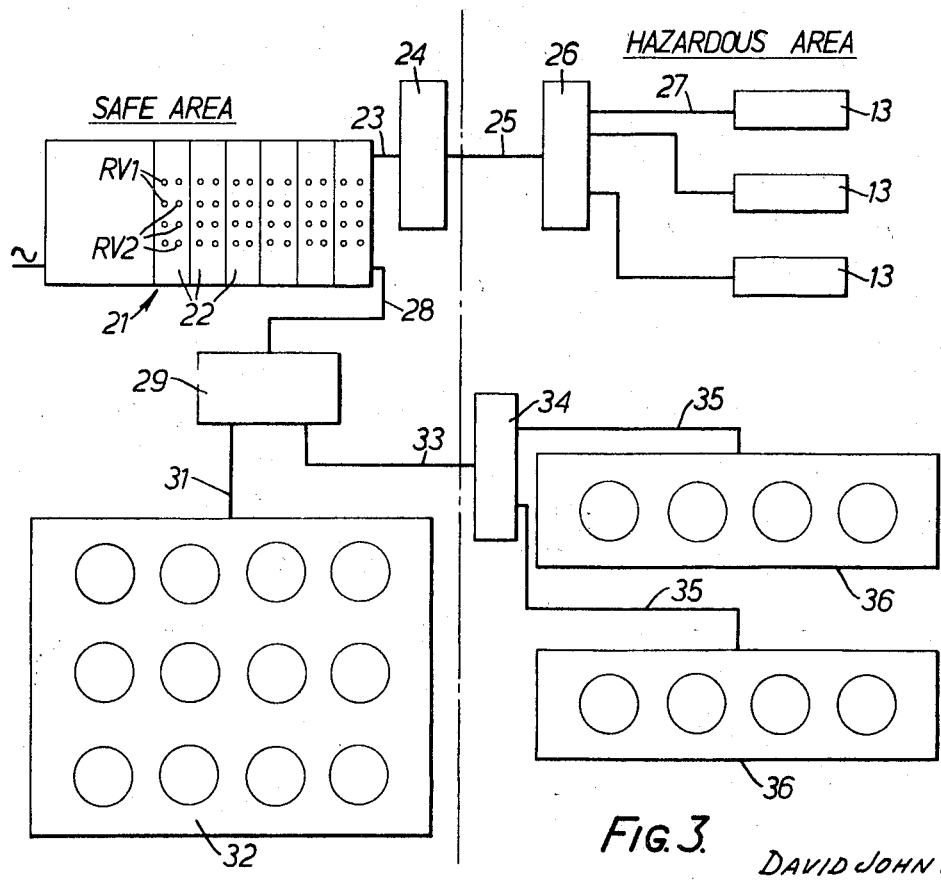
FIG. 3 is a diagrammatic illustration of the layout of the various parts of the invention when the movable member is located in a hazardous area.

The amplifier and the constant current circuit are intrinsically safe since they comprise only resistors and transistors. The milliameter has a very slight inductance, but normally this inductance is so small as not to cause any effective loss of intrinsic safety. The power supply is also intrinsically safe and it is therefore safe to locate the transducer 13 and the milliameter in a hazardous area. For the purpose of this specification a hazardous area refers to a zone in which the atmosphere is inflammable due to the presence of inflammable gases.

Where it is necessary to provide remote indicators for a large number of movable members located in hazardous areas it is convenient to arrange the amplifiers and constant current circuit as modules for side-by-side assembly in a rack, electrical connections being made to the modules by conventional plug and socket methods on insertion of the modules into the rack. Such a rack is diagrammatically shown at 21 in FIG. 3 in which six amplifier modules 22 are mounted in side-by-side arrangement. Each module includes four amplifiers as shown in FIG. 1 and for each amplifier the two variable resistors RV1 and RV2 are accessible on the external edge of the module for screwdriver adjustment. The rack 21 may also be provided for accommodating the power supply shown in FIG. 2. FIG. 3 illustrates schematically the arrangement of a multiple remote position indicator. The chain-dotted line in the middle of FIG. 3 represents a dividing wall or other structural element separating a safe area from a hazardous area. Within the safe area the rack 21 is located which includes the power supply and the transistor modules. A multicore cable 23 extends from the rack 21 to a junction box 24 within the safe area and from the junction box a further multicore cable 25 extends through the dividing structure to a junction box 26 in the hazardous area. From the junction box 26 individual cable connections extend to the various transducers 13 of which three only are shown by way of example. Within the safe area a further multicore cable 28 extends from the rack 21 to a junction box 29 from which one cable set 31 extends to a bank of meters 32 within the safe area. The number of meters shown in the bank 32 do not represent the maximum number possible. From the junction box 29 a further multicore cable 33 extends through the dividing structure to the hazardous area to a further junction box 34 from which cables 35 extend to meter assemblies 36. The meters in the assemblies 36 are provided as local indicating meters adjacent to the valves having the transducers 13. Where such local indicating meters are used there will be two meters for each amplifier and transducer, one meter in the safe area and one meter in the hazardous area. Through the intermediary of the cables and the junction boxes the two meters for each amplifier are effectively connected in series between R7 and the emitter of VT2. Normally these meters have quite a low internal resistance and the operation of the amplifier is not effectively changed whether or not one or a small number of meters is connected to it.

Each amplifier is individually adjustable by variable resistors RV1 and RV2 to adjust its amplification factor and in use the adjustments are such as to ensure that over the full range of movement of a transducer by a valve or other remote member the indicating needle of the associated meter will move only over the required part of its range, for example the 180° portion of its range mentioned previously.

We claim:

1. A remote position indicator for a movable member located in an inflammable atmosphere comprising a variable sensing resistor mechanically connected for adjustment by the movable member, an intrinsically safe power supply means including means to prevent a spark resulting from a malfunction of said power supply means from having sufficient energy to ignite said inflammable atmosphere, transistor constant current circuit means comprised entirely of at least one transistor and resistors connected in series with said variable sensing resistor across said intrinsically safe power supply means, said transistor constant current means operating to provide a constant current to said variable sensing resistor which is unaffected by variations in the resistance of said variable sensing resistor, a meter means operative to provide an indication which is a function of an input signal thereto, and transistor amplifier means comprised entirely by at least one transistor and at least one fixed resistor connected to receive current from said intrinsically safe power supply means and to provide an amplified input signal to said meter means, said transistor amplifier means including bias circuit means connected across said variable sensing resistor to receive a voltage signal therefrom and operative to cause said transistor amplifier means to amplify said voltage signal to provide said meter means input signal.

2. The remote position indicator of claim 1 wherein said variable sensing resistor varies in resistance in response to the maximum movement of said movable member an amount sufficient only to cause said metering means to indicate over only a portion of the available total indicating range thereof.

3. The remote position indicator of claim 2 wherein said bias circuit means includes a variable resistance means operable to vary the amplication factor of said amplifier means to cause said metering means to indicate over only a selected portion of the available total indicating range thereof in response to a maximum movement of the movable member.

4. The remote position indicator of claim 1 wherein said transistor constant current circuit means includes a transistor having a base circuit connected across said intrinsically safe power supply means, an emitter circuit connected to one terminal of said intrinsically safe power supply means and a collector circuit connected to a first terminal of said variable sensing resistor, said emitter circuit including temperature-compensating means to compensate for temperature variations of said transistor.

5. The remote position indicator of claim 4 wherein said transistor constant current means includes a variable resistor connected between said variable sensing resistor and said intrinsically safe power supply means, said bias circuit means being connected to a junction between said variable sensing resistor and said variable resistor, said transistor amplifier means including a transistor amplifier having a base electrode connected to said bias circuit means, a collector circuit connected to said intrinsically safe power supply means and an emitter connected to said meter means.

* * * * *